(12) United States Patent
Sato et al.

(10) Patent No.: US 9,337,634 B2
(45) Date of Patent: May 10, 2016

(54) WIRE HARNESS AND METHOD OF MANUFACTURING WIRE HARNESS

(71) Applicant: SUMITOMO WIRING SYSTEMS, LTD., Mie (JP)

(72) Inventors: Takeshi Sato, Mie (JP); Isamu Hamamoto, Mie (JP); Tetsuya Sonoda, Mie (JP); Osamu Satou, Mie (JP); Yasuki Takeuchi, Mie (JP)

(73) Assignee: SUMITOMO MIRING SYSTEMS, LTD., Mie (JP)

( * ) Notice: Subject to any disclaimer, the term of this patent is extended or adjusted under 35 U.S.C. 154(b) by 121 days.

(21) Appl. No.: 14/044,171

(22) Filed: Oct. 2, 2013

(65) Prior Publication Data

US 2014/0144698 A1      May 29, 2014

(30) Foreign Application Priority Data

Nov. 27, 2012   (JP) .................................. 2012-258212

(51) Int. Cl.
| | |
|---|---|
| *H02G 3/04* | (2006.01) |
| *H02G 3/06* | (2006.01) |
| *H02G 15/02* | (2006.01) |
| *H02G 15/08* | (2006.01) |
| *H01R 4/00* | (2006.01) |

(52) U.S. Cl.
CPC ........... *H02G 3/0481* (2013.01); *Y10T 156/103* (2015.01); *Y10T 156/1051* (2015.01)

(58) Field of Classification Search
CPC ....... H02G 15/02; H02G 15/08; H02G 15/18; H02G 15/1806; H02G 15/1813; H01B 7/18
USPC .... 174/72 A, 72 C, 74 A, 75 R, 84 R, 85, 92, 174/93; 137/375
See application file for complete search history.

(56) References Cited

U.S. PATENT DOCUMENTS

| | | | | |
|---|---|---|---|---|
| 3,013,106 | A | * | 12/1961 | Corneli ........................ 174/71 B |
| 3,192,377 | A | * | 6/1965 | Abolins ........................ 174/72 R |
| 3,770,556 | A | * | 11/1973 | Evans ..................... B29C 61/10 |
| | | | | 428/194 |
| 4,366,201 | A | * | 12/1982 | Changani et al. ........ 174/DIG. 8 |
| 4,384,167 | A | * | 5/1983 | Nestor ........................ 174/71 R |

(Continued)

FOREIGN PATENT DOCUMENTS

| | | | | |
|---|---|---|---|---|
| JP | 2000134784 | A * | 5/2000 | ............. H02G 15/08 |
| JP | 2012-39782 | | 2/2012 | |
| JP | 2012-110086 | | 6/2012 | |

OTHER PUBLICATIONS

English Translation of Sumitomo (JP 2012-39782A) provided with Office Action.*

(Continued)

*Primary Examiner* — Chau N Nguyen
*Assistant Examiner* — Roshn Varghese
(74) *Attorney, Agent, or Firm* — Greenblum & Bernstein, P.L.C.

(57) ABSTRACT

A wire harness includes a wire harness main body and a protective member. The wire harness main body includes a trunk line and a branch line branching from the trunk line. In a state where a non-woven member covers the trunk line and a base end of the branch line, the protective member is formed by hot pressing a portion of the non-woven member covering at least the trunk line. A portion of the protective member covering the base end of the branch line is formed to be more pliable than a portion covering the trunk line.

2 Claims, 9 Drawing Sheets

(56) References Cited

U.S. PATENT DOCUMENTS

| | | | |
|---|---|---|---|
| 4,467,137 A * | 8/1984 | Jonathan et al. | 174/87 |
| 4,496,410 A * | 1/1985 | Davis et al. | 428/35.1 |
| 4,625,073 A * | 11/1986 | Breesch et al. | 174/72 R |
| 5,178,923 A * | 1/1993 | Andrieu et al. | 428/36.1 |
| 6,960,722 B2 * | 11/2005 | Frederick et al. | 174/72 R |

OTHER PUBLICATIONS

English Translation of Takano (JP 2000-134784A) provided with Office Action.*

U.S. Appl. No. 14/044,052 to Takeshi Sato et al., which was filed on Oct. 2, 2013.

* cited by examiner

1

WIRE HARNESS AND METHOD OF MANUFACTURING WIRE HARNESS

CROSS-REFERENCE TO RELATED APPLICATIONS

The present application claims priority under 35 U.S.C. §119 of Japanese Application No. 2012-258212, filed on Nov. 27, 2012, the disclosure of which is expressly incorporated by reference herein in its entirety.

BACKGROUND OF THE INVENTION

1. Field of the Invention

The present invention relates to a technology protecting a branching portion of a wire harness.

2. Description of Related Art

Conventionally, a technology protecting a branching portion of a wire harness with a non-woven member is disclosed in Japanese Patent Laid-open Publication No. 2012-39782.

As a configuration in which the non-woven member covers the branching portion in a shape contoured to the shape of the branch, Japanese Patent Laid-open Publication No. 2012-39782 discloses a configuration in which a sheet-like non-woven member having a notch is wrapped around the branching portion. The non-woven member covering the branching portion is molded to a predetermined shape according to the shape of the branch using a molding die.

However, in the configuration in which the sheet-like non-woven member having the notch is wrapped around the branching portion, a base end portion of the notched portion is open and thus a branch line extends out to an exterior. Therefore, when the non-woven member is molded to the predetermined shape using the molding die, a base end portion of the branch line may be heated proximate to the opening.

Thus, the present invention seeks to inhibit heating of a branch line branching from a trunk line when the trunk line from which the branch line branches is covered by a non-woven member and hot pressed.

SUMMARY OF THE INVENTION

In order to resolve the above issue, a wire harness includes a wire harness main body and a protective member. The wire harness main body includes a trunk line and a branch line branching from the trunk line. In a state where a non-woven member covers the trunk line and a base end of the branch line, the protective member is formed by hot pressing a portion of the non-woven member covering at least the trunk line. A portion covering the base end of the branch line is formed to be more pliable than the portion covering the trunk line.

Another aspect is the wire harness, wherein, in a state where a slit is formed in the sheet-like non-woven member from a middle portion of a first edge portion toward an interior and the base end of the branch line is arranged at a base end of the slit, the protective member is formed by wrapping two side portions of the slit in the non-woven member around the trunk line.

Another aspect is the wire harness, wherein a portion of the non-woven member extending toward the base end of the slit is formed to be thicker than other portions and the extending portion is wrapped around the trunk line at a position corresponding to the branch line.

A manufacturing method of a wire harness includes: preparing a wire harness main body that includes a trunk line and a branch line branching from the trunk line; covering the trunk line and a base end of the branch line with a non-woven member; and hot pressing a portion of the non-woven member covering the trunk line in a state where a portion of the non-woven member covering the base end of the branch line protrudes from a molding die surface, the hot pressing being performed with a molding die for hot pressing having the molding die surface, the molding die surface applying heat and pressure to the portion of the non-woven member covering the trunk line.

Another aspect is the manufacturing method of the wire harness, wherein, in the hot pressing, a forefront end of the portion of the non-woven member covering the base end of the branch line protrudes toward an exterior of the molding die for hot pressing.

Another aspect is the manufacturing method of the wire harness, wherein, in the covering, a sheet-like non-woven member having a slit formed from a middle portion of a first edge portion toward an interior is used as the non-woven member, and two side portions of the slit in the non-woven member are wrapped around the trunk line in a state where the base end of the branch line is arranged at a base end of the slit.

Another aspect is the manufacturing method of the wire harness, wherein a portion of the non-woven member extending toward the base end of the slit is formed to be thicker than other portions and the extending portion is wrapped around the trunk line at a position corresponding to the branch line.

Another aspect is the manufacturing method of the wire harness, wherein a portion of the non-woven member corresponding to the slit is folded back at the base end of the slit onto the portion extending toward the base end of the slit, and the portion of the non-woven member extending toward the base end of the slit is made thicker than other portions.

According to an aspect of the present invention, the protective member is formed by hot pressing at least the portion of the non-woven member covering the trunk line in the state where the non-woven member covers the trunk line and the base end of the branch line, and the portion of the non-woven member covering the base end of the branch line is formed to be more pliable than the portion covering the trunk line. Therefore, heating of the branch line branching from the trunk line can be inhibited.

According to another aspect of the present invention, a gap in the non-woven member wrapped around the trunk line can be eliminated as much as possible and uniformity of thickness can be achieved.

According to another aspect of the present invention, the non-woven member can be made thick even in a position on the trunk line corresponding to the branch line.

According to another aspect of the present invention, the portion of the non-woven member covering the trunk line is hot pressed in a state where the portion of the non-woven member covering the base end of the branch line protrudes from the molding die surface. Therefore, heating of the branch line branching from the trunk line can be inhibited.

According to another aspect of the present invention, the branch line is exposed from the non-woven member toward the exterior of the molding die for hot pressing. Therefore, heating of the branch line can be more reliably inhibited.

According to another aspect of the present invention, a gap in the non-woven member wrapped around the trunk line can be eliminated as much as possible and uniformity of thickness can be achieved.

According to another aspect of the present invention, the non-woven member can be made thick even in a position on the trunk line corresponding to the branch line.

According to another aspect of the present invention, the portion of the non-woven member extending toward the base end of the slit can readily be made thicker than the other portions.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
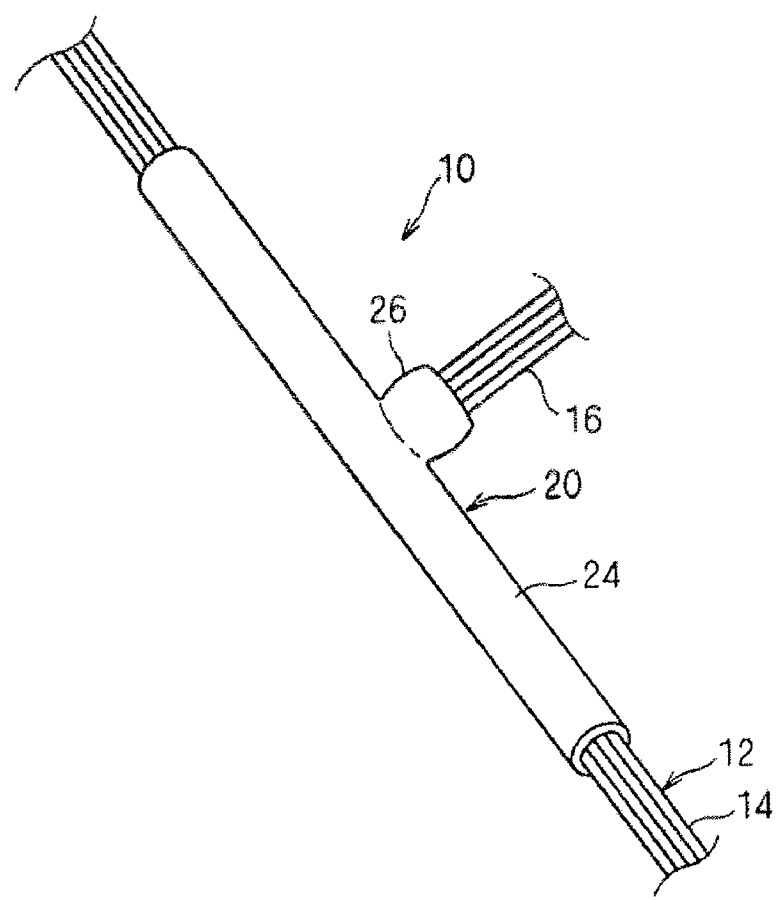
FIG. 1 is a schematic perspective view illustrating a wire harness according to an embodiment.
Figure 2:
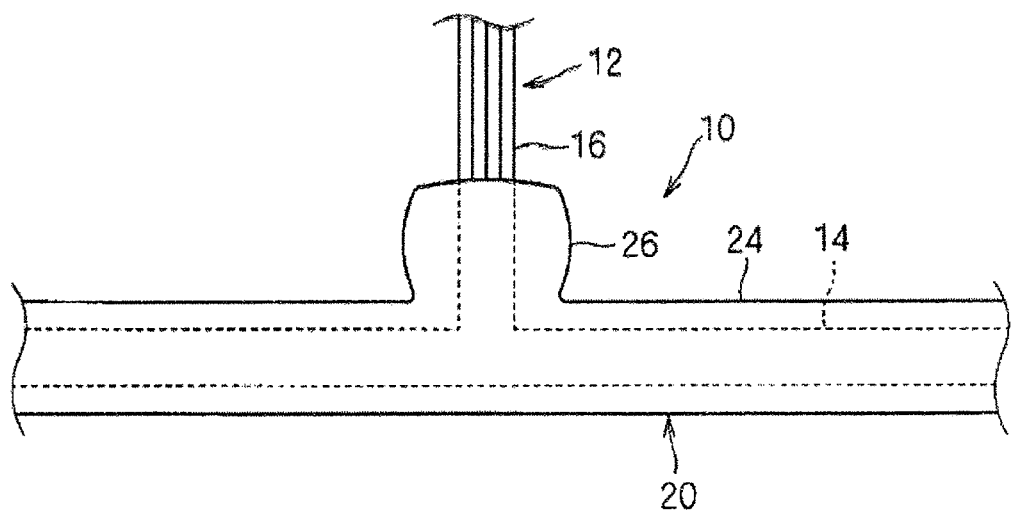
FIG. 2 is a schematic plan view illustrating the wire harness.

Hereafter, a wire harness and a manufacturing method of the wire harness are described according to an embodiment. FIG. 1 is a schematic perspective view illustrating a wire harness 10. FIG. 2 is a schematic plan view illustrating the wire harness 10.

The wire harness 10 includes a wire harness main body 12 and a protective member 20.

The wire harness main body 12 is configured by bundling a plurality of electric wires. More specifically, the wire harness main body 12 is configured by the plurality of electric wires being bundled while creating a branch according to a wiring model, which is where the electric wires are to be placed in a vehicle or the like. The wire harness main body 12 may also include optical cables and the like. In a state where the wire harness main body 12 is arranged in the placement location in the vehicle or the like, the wire harness main body 12 is used as a wiring electrically connecting various electrical devices mounted in the vehicle or the like.

The wire harness main body 12 includes a trunk line 14 and a branch line 16 branching from the trunk line 14. In other words, the plurality of electric wires are provisionally gathered using a bundling member such as an adhesive tape, then the plurality of electric wires are bundled so as to configure the trunk line 14. In addition, a portion of the plurality of electric wires branch off from the trunk line 14 to form the branch line 16. The branch line 16 may be a bundled plurality of electric wires, or may be configured with a single electric wire.

In the wire harness main body 12, of three branching wire bundles, any two can be designated as the trunk line 14 and the remaining one can be designated as the branch line 16. Typically, of the three branching wire bundles, two bundles having a thick diameter or two bundles having a large number of electric wires are chosen as the trunk line 14 and a bundle having a thin diameter is chosen as the branch line 16.

Also, the trunk line 14 has a straight line shape at least in a portion extending from the branching-off point. Other portions of the trunk line 14 may be bent or may have other electric wires branching off. In addition, the trunk line 14 may be bent at the branching-off point of the branch line 16. Moreover, a plurality of branch lines 16 may extend to the same location of the trunk line 14.

The protective member 20 is configured such that, in a state where the non-woven member covers the trunk line 14 and the base end of the branch line 16, the protective member 20 is formed by hot pressing at least a portion of the non-woven member.

Herein, a non-woven material capable of hardening when undergoing a heat and pressure application process and capable of mutual adhesion is used as the non-woven member.

As the non-woven material of this type, a non-woven material that includes interwoven elementary fibers and an adhesive resin (also referred to as a binder) can be used. The adhesive resin is a resin having a melting point lower than that of the elementary fibers. Also, when the non-woven material is heated at a treatment temperature lower than the melting point of the elementary fibers and higher than the melting point of the adhesive resin, the adhesive resin melts and seeps in between the elementary fibers. Thereafter, when the temperature of the non-woven material becomes lower than the melting point of the adhesive resin, the adhesive resin hardens in a state bonding the elementary fibers together. The non-woven material then becomes harder than in a state before heating and is maintained in a shape molded during the heating. In addition, the adhesive resin seeps into and hardens at portions of the non-woven member that touch, thereby joining together the touching portions of the non-woven member. Such a non-woven material is also called a non-woven fabric.

The adhesive resin may have a granular shape or a fiber shape. The adhesive resin may also be configured as an adhesive resin layer formed on an outer circumference of a core fiber to configure a binder fiber, which may be interwoven with the elementary fibers. The same material as that of the elementary fibers described above can be used as the core fiber in such a case.

The elementary fiber should be able to hold a fiber form at the melting point of the adhesive resin and various kinds of fibers can be used as the elementary fiber besides a resin fiber. In addition, a thermoplastic resin fiber having a melting point lower than the melting point of the elementary fiber can be used as the adhesive resin. Examples of a combination of the elementary fiber and the adhesive resin include using a PET (polyethylene terephthalate) resin fiber for the elementary fiber and a PET and PEI (polyethylene isophthalate) copolymer resin for the adhesive resin. In such a case, the melting point of the elementary fiber is higher than that of the adhesive resin, and therefore when the non-woven material is heated to a temperature between those melting points, the adhesive resin melts and seeps in between the elementary fibers, which hold their fiber shape without melting. Then, when the temperature of the non-woven material becomes lower than the melting point of the adhesive resin, the adhesive resin hardens in a state bonding the elementary fibers together, the non-woven material hardens and maintains the shape molded during the heating. Specifically, the non-woven material is placed between molding dies having molding die surfaces for molding, then pressure is applied to the molding dies in a heated state. Thereby, the non-woven material is die-molded to a predetermined shape corresponding to the molding die surfaces and, when cooled, the die-molded shape is maintained. Also, in portions of the non-woven member that touch each other, the melted adhesive resin seeps into neighboring portions, then hardens. Thereby, the portions of the non-woven member that touch each other are joined. The above processing method is called hot pressing. A more specific example of manufacturing the protective member 20 is described later.

The portion of the non-woven member covering the trunk line 14 is formed into a hardened trunk line protector 24 by hot pressing. The trunk line protector 24 is formed in a cylindrical shape covering the trunk line 14 in a tightly adhered state. Herein, the trunk line protector 24 is formed in a circular cylinder shape contoured to an outer shape of the trunk line 14. However, the portion may be formed in some other shape, such as an elliptical cylinder shape or a squared tube shape. A length dimension of the trunk line protector 24 is not particularly limited. The trunk line protector 24 may have a length dimension long enough to cover a portion of the trunk line 14 proximal to the branch line 16, and may have a length dimension long enough to be able to cover a more complete portion of the trunk line 14.

The trunk line protector 24 has a role of holding the trunk line 14 in a predetermined pathway shape. In addition, by integrally forming a branch line protector 26, described next, with the trunk line protector 24, the trunk line protector 24 has a role of maintaining in fixed positions a position of the branch line protector 26 with respect to the trunk line 14 and a position of the branch line 16 extending through the branch line protector 26.

Also, the portion of a non-woven member 30 covering the base end of the branch line 16 is formed into the branch line protector 26, which is more pliable than the trunk line protector 24. The branch line protector 26 is integrally formed with the trunk line protector 24 such that the branch line protector 26 projects laterally from partway along a longitudinal direction of the trunk line protector 24. By retaining a position of the base end of the branch line 16 extending from the trunk line 14, the branch line protector 26 has a role of retaining the branching-off position.

The branch line protector 26 is formed to be more pliable than the trunk line protector 24. Therefore, when the branch line protector 26 is processed, heat-related effects acting on the branch line protector 26 can be reduced. In other words, when forming the trunk line protector 24, in order to form the branch line protector 26 to be pliable, at least one of a temperature or a compression rate acting on the branch line protector 26 must be reduced further than that acting on the trunk line protector 24. In addition, when the temperature acting on the branch line protector 26 itself is smaller, heat-related effects on the branch line 16 guided through an interior thereof can be reduced. Further, when the compression rate of the branch line protector 26 is smaller, heat becomes unlikely to transmit through the non-woven member to the branch line 16 within, and thus, in such a case, too, heat-related effects on the branch line 16 guided through the interior of the branch line protector 26 can be reduced.

In addition, the branch line protector 26 only covers the base end of the branch line 16. Thus, coverage of the base end of the branch line 16 by the entire branch line protector 26 can be maintained due to the portion integrally formed with the trunk line protector 24 maintaining the shape that covers a root of the branch line 16. Therefore, an extent of heating and compression may be reduced for the non-woven member configuring the branch line protector 26, or no heating and compression may be performed at all.

The branch line protector 26 covers only the base end of the branch line 16. Therefore, the branch line 16 can be freely bent for wiring at a position where the branch line 16 extends from the branch line protector 26.

Figure 3:
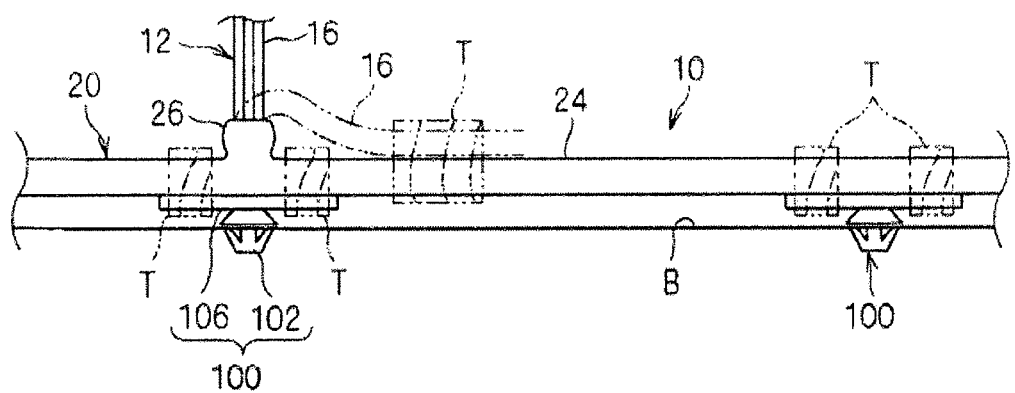
FIG. 3 is an explanatory view illustrating a state in which the wire harness is attached to a vehicle.

FIG. 3 is an explanatory view illustrating a state in which the wire harness 10 is attached to a vehicle.

In other words, a vehicle attachment member 100 is attached partway along the trunk line 14 of the wire harness 10. Herein, a clamp 102 capable of fixating to a hole formed in a vehicle body B and a member having a long, thin plate-shaped portion 106 on a top portion of the clamp 102 (also called a double-sleeve clamp) is used as the vehicle attachment member 100. The vehicle attachment member 100 is attached to the trunk line protector 24 by fixating the long, thin plate-shaped portion 106 to the trunk line protector 24 by wrapping an adhesive tape T or the like thereto. A plurality of the vehicle attachment members 100 are attached at intervals to the trunk line protector 24 of the wire harness 10. Also, by engaging and fixating each of the vehicle attachment members 100 to holes formed in the vehicle body B, the wire harness 10 is attached and fixated along the vehicle body B. Moreover, the wire harness 10 may be fixated with some other vehicle attachment member such as a band clamp, for example.

In the attached state, the trunk line protector 24 and the trunk line 14 therein are maintained in a straight line between each of the vehicle attachment members 100 by rigidity of the trunk line protector 24. Therefore, a predetermined wiring model is maintained without contact with the vehicle body B or the like.

In addition, the branch line 16 can bend freely at a portion where the branch line 16 extends from the branch line protector 26. Therefore, in a case where the branch line 16 need not extend alongside the trunk line 14 (e.g., in a ease where the wire harness 10 is transported/conveyed to a vehicle assembly plant, or in a case where the branch line 16 is wiring or the like for an optional component in the vehicle and is not used), a portion of the branch line 16 extending from the branch line protector 26 is arranged along the trunk line protector 24 and is wrapped by the adhesive tape T or the like (see a portion shown in two-dot-dashed lines in FIG. 3).

Therefore, in the present state, the branch line 16 can be in a state arranged along the trunk line 14 and the trunk line protector 24. Thereby, for example, when transporting/conveying the wire harness 10, the branch line 16 can be given a shape that is compact and appropriate for a packing format and that has few protruding shapes.

In addition, in a case where the branch line 16 is used, the bundle made by the adhesive tape T is released and the branch line 16 is pulled outward from the trunk line 14 and the trunk line protector 24, then wired along a predetermined wiring pathway.

An exemplary manufacturing method for manufacturing the wire harness 10 is described.

Figure 4:
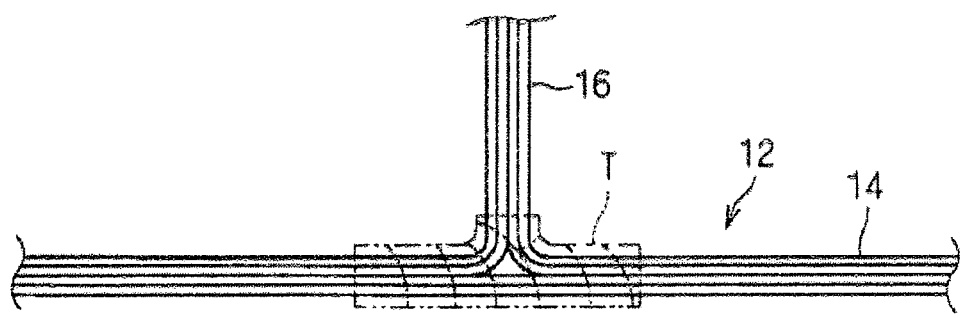
FIG. 4 is a schematic plan view illustrating a wire harness main body.

First, as shown in FIG. 4, the wire harness main body 12 is prepared, which includes the trunk line 14 and the branch line 16 branching from the trunk line 14. The wire harness main body 12 is manufactured by, for example, performing work to provisionally bundle the plurality of electric wires using the tape T while creating a branch from the plurality of electric wires.

Figure 5:
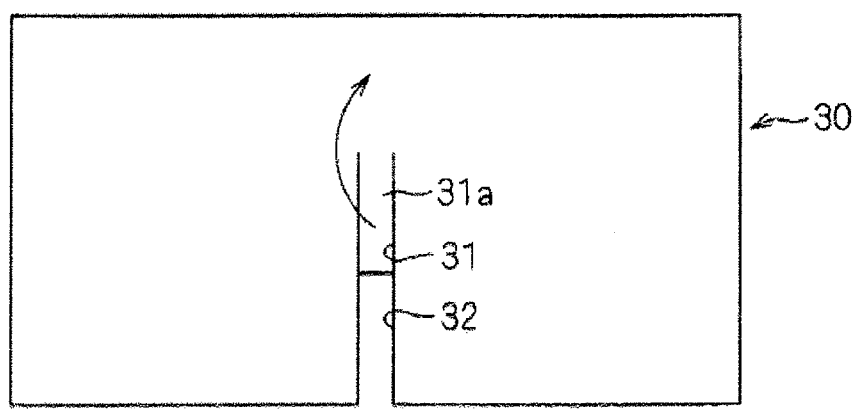
FIG. 5 is an explanatory view illustrating an exemplary non-woven member.
Figure 6:
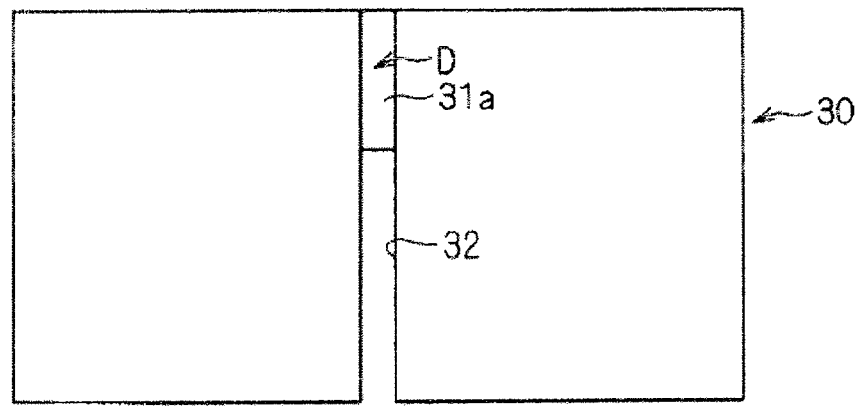
FIG. 6 is an explanatory view illustrating an exemplary non-woven member.
Figure 7:
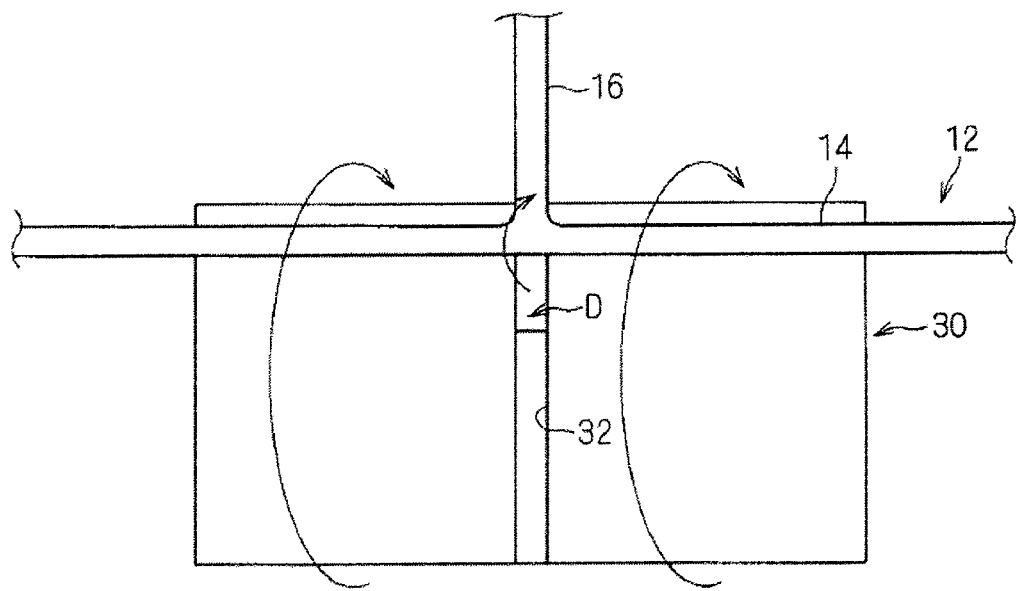
FIG. 7 is an explanatory view illustrating an intermediate step of wrapping the non-woven member around the wire harness main body.

Next, as shown in FIGS. 5 to 7, the trunk line 14 and the base end of the branch line 16 are covered by the non-woven member 30.

Figure 14:
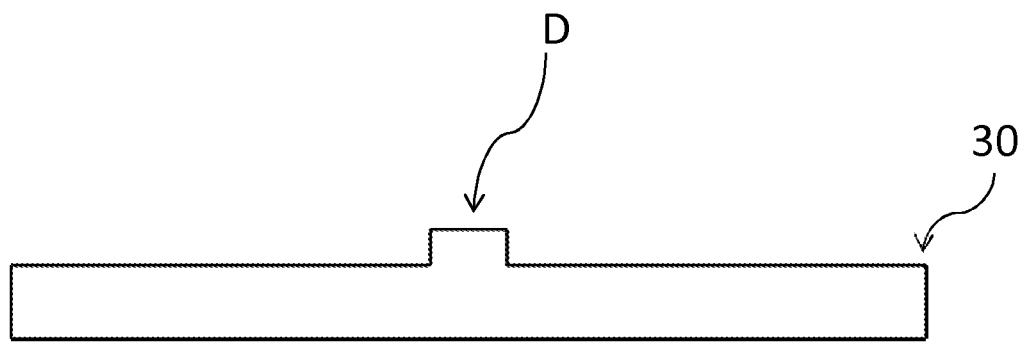
FIG. 14 is a side view of the exemplary non-woven member in FIG. 6.

This non-woven member 30 is preferably a sheet-like non-woven member 30 formed in a rectangular shape, and preferably a slit 32 is formed from a middle portion on a first edge portion (herein, a center portion of a first edge portion) toward an interior of the non-woven member 30. More preferably, a portion of the non-woven member 30 extending toward a base end of the slit 32 (see arrow D in FIGS. 6 and 14) is preferably formed to be thicker than other portions.

More specifically, parallel notches 31 are formed at the center portion of the first edge portion of the rectangular sheet-like non-woven member 30 (lower edge portion in FIGS. 5 to 7), and the slit 32 is formed between the notches 31. The portion of the non-woven member 30 extending toward the base end of the slit 32 (i.e., a distance between the base end of the slit 32 and a second edge portion of the non-woven member 30) is preferably an outer circumference of a portion of the trunk line 14 from which the branch line 16 extends and is preferably a length dimension long enough to exceed a length of the outer circumference, minus the portion from which the branch line 16 extends (see FIG. 9). This is because, thereby, the base end of the branch line 16 can be covered while the trunk line 14 is covered by the portion of the non-woven member 30 extending toward the base end of the slit 32. In addition, a width of the slit 32 is preferably the same as a diameter of the branch line 16; however, the width of the slit 32 may also be smaller or larger than the branch line 16. Also, the slit 32 may be formed in a notch shape of only a single line.

Further, a segment of the portion of the non-woven member 30 corresponding to the slit 32 remains unnotched. Specifically, a forefront portion of the portion between the pair of notches 31 on the non-woven member 30 is removed, and a base end portion 31a remains as a portion corresponding to the slit 32, without being removed. A length dimension of the base end portion 31a is set to be the same as a distance to the portion of the non-woven member 30 extending toward the base end of the slit 32 (i.e., between the base end of the slit 32 and the second edge portion of the non-woven member 30 (upper edge portion in FIGS. 5 to 7)). In addition, the base end portion 31a is folded at a base end thereof and is folded to overlay the portion of the non-woven member 30 extending toward the base end of the slit 32. Thereby, the portion of the non-woven member 30 extending toward the base end of the slit 32 is formed to be thicker than other portions. Thus, without using another non-woven member 30, the portion of the non-woven member 30 extending toward the base end of the slit 32 can be readily made thick.

However, the portion of the non-woven member 30 extending toward the base end of the slit 32 may also be formed to be thick by overlaying another non-woven member. Also, the portion of the non-woven member 30 extending toward the base end of the slit 32 is not necessarily thick.

In addition, a dimension linking the first edge portion and the second edge portion of the non-woven member 30 is preferably formed to a length dimension capable of being wrapped once or more, and preferably twice or more, on the trunk line 14.

Figure 8:
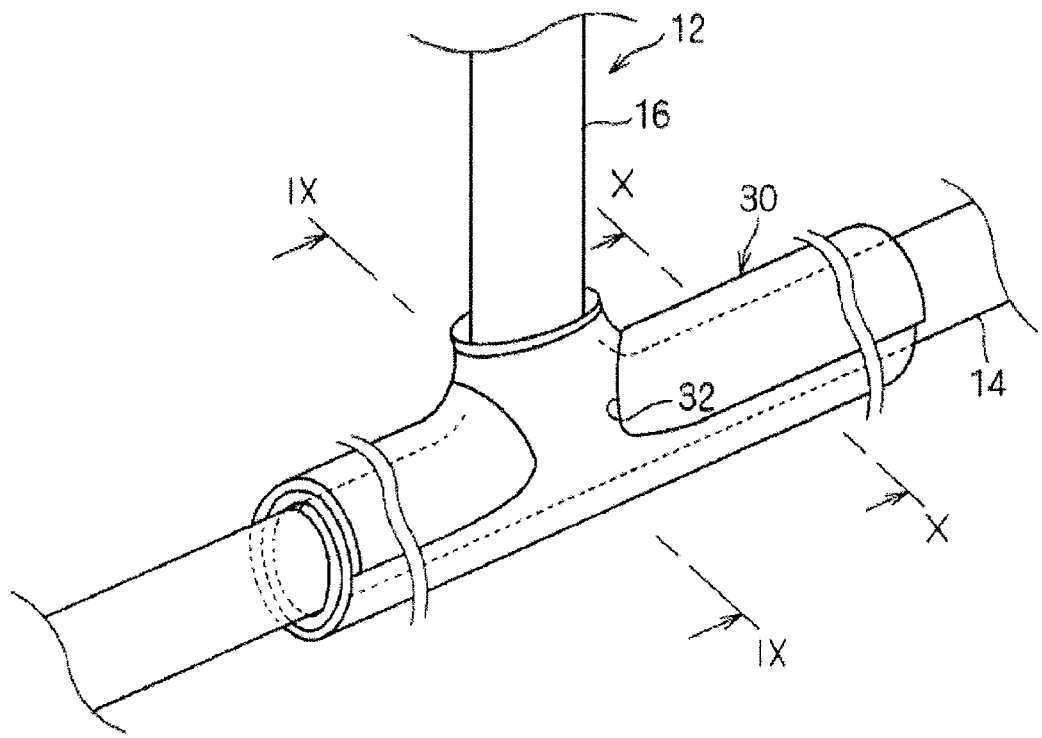
FIG. 8 is a schematic perspective view illustrating a state in which the non-woven member is wrapped around the wire harness main body.
Figure 9:
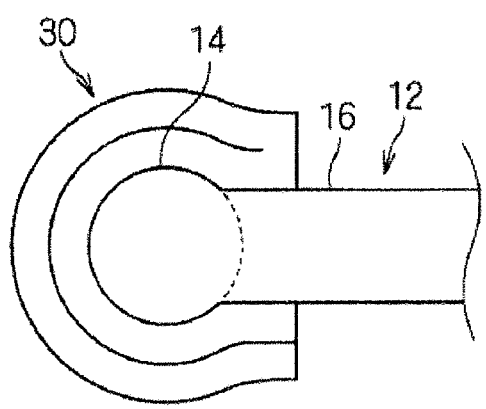
FIG. 9 is a schematic cross-sectional view along a line IX-IX in FIG. 8.

The non-woven member 30 is attached, as shown in FIGS. 7 to 9, so as to cover the wire harness main body 12.

In other words, the trunk line 14 of the wire harness main body 12 is arranged along the second edge portion of the non-woven member 30 (see FIG. 7). Then, the branch line 16 is arranged on the portion of the non-woven member 30 extending toward the base end of the slit 32.

Also, the base end of the branch line 16 is arranged at the base end of the slit 32 while the portion of the non-woven member 30 extending toward the base end of the slit 32 is wrapped around a location on the trunk line 14 from which the branch line 16 branches. Then, the portion of the non-woven member 30 extending toward the base end of the slit 32 covers a remaining outer circumference of a location where the branch line 16 extends, which is a location on the trunk line 14 from which the branch line 16 branches. In addition, both ends of the extending portion are overlaid on the base end of the branch line 16 such that the base end is between both ends of the extending portion (see FIGS. 8 and 9).

Figure 10:
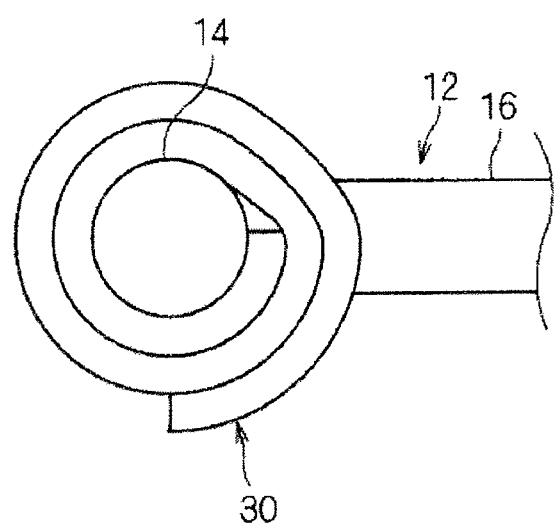
FIG. 10 is a schematic cross-sectional view along a line X-X in FIG. 8.

In addition, the two portions of the non-woven member 30 on both sides of the slit 32 and the portion extending toward the base end thereof are wrapped around two sides of the location on the trunk line 14 from which the branch line 16 extends (see FIGS. 8 and 10).

The non-woven member 30 is wrapped around the two portions of the non-woven member 30 on both sides of the slit 32 and the portion extending toward the base end thereof so as to pass over them twice. Therefore, a sufficient amount of the non-woven member 30 is wrapped around the trunk line 14 to achieve a protective ability and a pathway maintenance ability (see FIG. 10). Moreover, double-sided tape or the like may be adhered to an inner side of an end portion of the non-woven member 30 which forms the end of wrapping and the non-woven member 30 may be temporarily held in a wrapped state by the double-sided tape or the like.

In addition, at a location of the trunk line 14 from which the branch line 16 branches, the non-woven member 30 is wrapped only once around the trunk line 14. However, because the portion of the non-woven member 30 extending toward the base end of the slit 32 is formed to be thicker than other portions, both side portions of the non-woven member 30 have the same thickness. Therefore, even at this portion, a sufficient amount of the non-woven member 30 is wrapped to achieve a protective ability and a pathway maintenance ability of the trunk line 14 (see FIG. 9).

Next, the non-woven member 30 is hot pressed.

Figure 11:
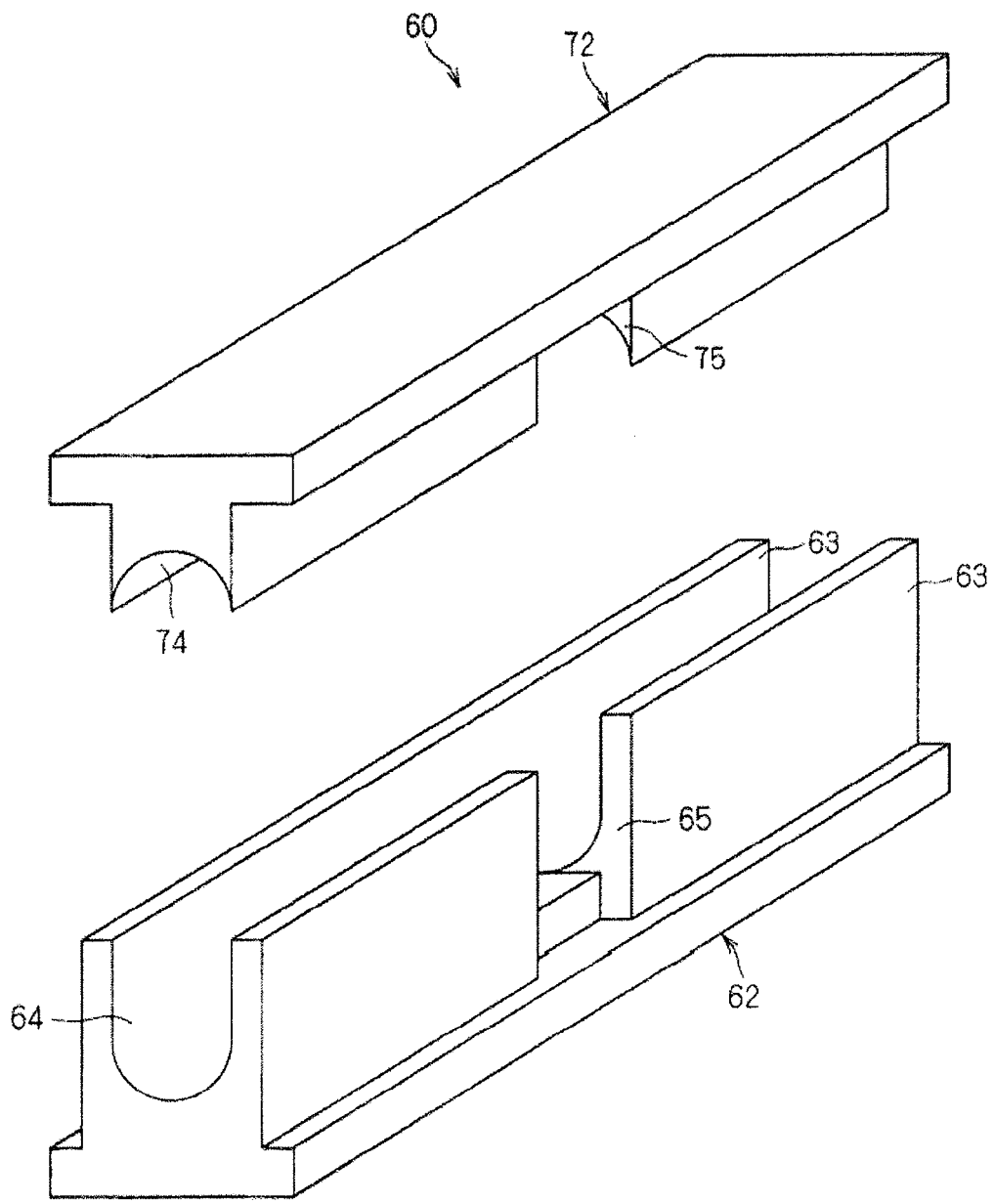
FIG. 11 is a schematic perspective view illustrating a molding die for hot pressing.

FIG. 11 is a perspective view illustrating an example of a molding die for hot pressing 60 used in the hot pressing. The molding die for hot pressing 60 includes a bottom die 62 and a top die 72.

The bottom die 62 is an elongated member formed with metal or the like having excellent thermal conductivity, on a first main surface (top surface) of which a bottom die surface 64 is formed. Herein, the bottom die surface 64 formed on the bottom die 62 is formed in a straight-line, recessed trench shape. A bed of the bottom die surface 64 is formed in a semicircular columnar outer circumferential surface shape and shapes the outer circumferential surface of a lower half of the trunk line 14.

In addition, at a longitudinal-direction middle portion of a first side of the bottom die surface 64, a recess 65 is formed passing through an interior and exterior of the bottom die surface 64. Herein, the recess 65 is formed at the longitudinal-direction middle portion of one of a pair of walls 63 on two sides of the bottom die surface 64, the recess 65 being formed in a shape recessed from an upper portion of the wall 63 toward the bed. Also, a portion of the recess 65 formed toward a lateral exterior of the bottom die surface 64 is formed so as to be recessed further than the bed of the bottom die surface 64.

The top die 72 is an elongated member formed with metal or the like having excellent thermal conductivity, on a first main surface (bottom surface) of which a top die surface 74 is formed. The top die surface 74 is formed in a shape capable of sealing an upward opening of the bottom die surface 64 (herein, a semicircular columnar outer circumferential surface shape) and shapes the outer circumferential surface of an upper half of the trunk line 14.

In addition, at a position corresponding to the recess 65, which is a longitudinal-direction middle portion of a first side of the top die surface 74, a recess 75 is formed. A portion of the recess 75 formed on a lateral exterior side of the top die surface 74 is formed so as to be recessed further than the top of the top die surface 74.

Also, a molding surface having a circular columnar outer circumferential shape is formed in order to shape the exterior shape of the trunk line 14 with the bottom die surface 64 and the top die surface 74. In addition, on a first side of the die surfaces having the circular columnar outer circumferential surface shapes, an opening is formed by the recesses 65 and 75 in order to guide the branch line 16 to the exterior.

Moreover, a heater is provided on the bottom die 62 and the top die 72 as a heating device. The heater heats the bottom die surface 64 and the top die surface 74 to a temperature lower than the melting point of the elementary fiber and higher than the melting point of the adhesive resin.

Also, the top die 72 is arranged and supported so as to be displaceable between contact with and separation from the bottom die 62. In a state where the top die 72 is in closest contact with the bottom die 62, the top die surface 74 is arranged facing the bottom die surface 64 and a circular columnar space is formed between the bottom die surface 64 and the top die surface 74. Then, by applying heat and pressure to the non-woven member 30 between the bottom die surface 64 and the top die surface 74, the non-woven member 30 is die molded to the shape corresponding to the shape of the bottom die surface 64 and the top die surface 74.

The non-woven member 30 attached so as to cover the wire harness main body 12 is arranged in the molding die for hot pressing 60 in the following way.

Figure 12:
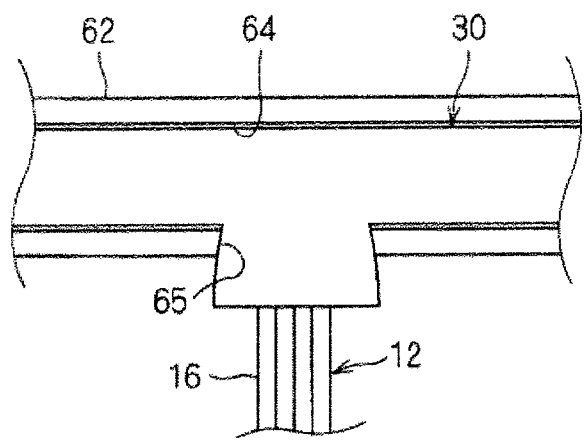
FIG. 12 is a schematic plan view illustrating a state in which the non-woven member is set in the molding die for hot pressing.
Figure 13:
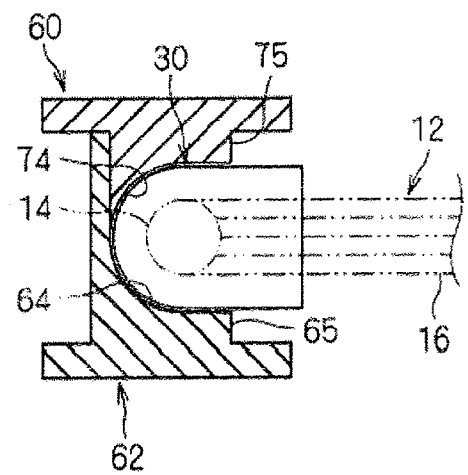
FIG. 13 is a schematic cross-sectional view illustrating a state in which the non-woven member is set in the molding die for hot pressing.

Specifically, as shown in FIGS. 12 and 13, a portion of the non-woven member 30 covering the trunk line 14 is arranged within the bottom die surface 64.

Also, a portion of the non-woven member 30 covering the base end of the branch line 16 is configured to protrude from the bottom die surface 64. Preferably, a forefront end of the portion of the non-woven member 30 covering the base end of the branch line 16 is configured to protrude outward from the recess 65 and to protrude outward of the molding die for hot pressing 60.

Hereafter, the bottom die 62 and the top die 72 are displaced in an approaching direction in a heated state, and pressure is applied between the two members. Then, heat and pressure are applied to the non-woven member 30 covering the trunk line 14 between the bottom die surface 64 and the top die surface 74. Thereby, the portion of the non-woven member 30 covering the trunk line 14 is die molded to a shape of the tubular trunk line protector 24 covering the trunk line 14.

Also, a portion arranged within the recesses 65 and 75, which is a portion of the non-woven member 30 covering the base end of the branch line 16, maintains a state more pliable than the trunk line protector 24. In other words, a space formed within the recesses 65 and 75 widens further than a die surface formed by the bottom die surface 64 and the top die surface 74. Therefore, a compression rate of a portion of the non-woven member 30 arranged within the recesses 65 and 75 is smaller than the compression rate of a portion of the non-woven member 30 arranged between the bottom die surface 64 and the top die surface 74. In addition, due to the recesses 65 and 75 being close to an exterior of the molding die for hot pressing 60, the temperature is more readily lowered as compared to the bottom die surface 64 and the top die surface 74. Therefore, a temperature applied to the portion of the non-woven member 30 arranged within the recesses 65 and 75 is readily reduced further than the temperature applied to the portion of the non-woven member 30 arranged between the bottom die surface 64 and the top die surface 74.

Therefore, for the portion arranged within the recesses 65 and 75, which is the portion of the non-woven member 30 covering the base end of the branch line 16, at least one of the compression rate or the temperature applied to the portion is reduced. Thus, an extent of the hot press processing can be reduced and, accordingly, the branch line protector 26 can be made more pliable.

Further, the branching-off point on the wire harness main body 12 can be covered by less of the non-woven member 30 (e.g., by a single wrapping of the non-woven member 30).

In addition, the forefront end of the non-woven member 30 protruding outward from the recesses 65 and 75 is in a state not directly heated and not directly compressed by the molding die for hot pressing 60, and is made to be more pliable than a portion toward the base end thereof. The branch line 16 extending past the forefront end of the branch line protector 26 extends outward from the branch line protector 26 outside of the molding die for hot pressing 60, and therefore heating of the branch line 16 can be inhibited more reliably.

Thereafter, the bottom die 62 and the top die 72 are separated and the die-molded protective member 20 is removed from the two members, thus providing the wire harness 10. Cooling after the application of heat and pressure may be performed in a state where the protective member 20 is between the bottom die 62 and the top die 72, or in a state where the protective member 20 is removed from between the two dies.

Moreover, in the embodiment above, an example was described in which one branch line 16 is branched from the trunk line 14. However, other branch lines may branch from the same location.

With the wire harness 10 configured as described above, in a state where the non-woven member 30 covers the trunk line 14 and the base end of the branch line 16, the protective member 20 is formed by hot pressing a portion of the non-woven member 30 covering at least the trunk line 14, and the branch line protector 26 of the non-woven member 30 covering the base end of the branch line 16 is formed to be more pliable than the trunk line protector 24. Therefore, when the branch line protector 26 is formed, at least one of the compression rate or the temperature of the branch line protector 26 is small. Accordingly, when the branch line protector 26 is formed, heating of the interior of the branch line protector 26 and of the branch line 16 extending therefrom can be inhibited.

Moreover, the protective member 20 is formed by wrapping the sheet-like non-woven member 30 around the trunk line 14, the non-woven member 30 having the slit 32 formed from the middle portion of the first edge portion toward the interior thereof, the two side portions of the slit 32 in the non-woven member 30 being wrapped around the trunk line 14 in a state where the base end of the branch line 16 is arranged at the base end of the slit 32. Therefore, the sheet-like non-woven member 30 is wrapped around the trunk line 14 without any gaps and at a uniform thickness, and thus gaps in the trunk line protector 24 can be eliminated and uniformity of thickness can be achieved. Thereby, an ability of the trunk line protector 24 to hold a shape can be stabilized, as can quality of an anti-abrasion ability.

In addition, the portion of the non-woven member 30 extending toward the base end of the slit 32 is formed to be thicker than other portions and the extending portion is wrapped around the trunk line at a position corresponding to the branch line 16. Therefore, the non-woven member 30 can be made sufficiently thick, even at a location on the trunk line protector 24 corresponding to the branch line 16.

The present invention has been described in detail above; however, the above description is in all respects illustrative and the present invention is not limited to the above description. Numerous modifications not named as examples are understood to be conceivable without deviating from the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A wire harness comprising:
    a wire harness main body having a trunk line and a branch line branching from the trunk line; and
    a protective member defined by a hot-pressed non-woven member having an adhesive resin and covering the trunk line and a base end of the branch line, wherein
    a portion of the protective member covering the base end of the branch line is more pliable than a portion of the protective member covering the trunk line,
    a slit is provided in the non-woven member from a middle portion of a first edge portion toward an interior, and the base end of the branch line is arranged at a base end of the slit, the protective member being defined by two side portions of the slit in the non-woven member that are wrapped around the trunk line, and
    a portion of the non-woven member extending toward the base end of the slit is thicker than other portions of the non-woven member, and the portion of the non-woven member extending toward the base end is wrapped around the trunk line at a position corresponding to the branch line.

2. The wire harness according to claim 1, wherein the non-woven member is a unitary member.

* * * * *